United States Patent [19]
Wong

[11] Patent Number: 5,408,556
[45] Date of Patent: Apr. 18, 1995

[54] 1 X N SPLITTER FOR SINGLE-MODE FIBERS AND METHOD OF CONSTRUCTION

[75] Inventor: Ren-Sue Wong, Sunnyvale, Calif.

[73] Assignee: Kaptron, Inc., Palo Alto, Calif.

[21] Appl. No.: 162,690

[22] Filed: Dec. 6, 1993

[51] Int. Cl.$^6$ .............................................. G02B 6/32
[52] U.S. Cl. ...................................... 385/48; 385/43; 385/33; 385/15
[58] Field of Search ................ 385/48, 31, 33, 39, 385/41–47, 15, 24

[56] References Cited

U.S. PATENT DOCUMENTS

| | | | |
|---|---|---|---|
| 4,360,248 | 11/1982 | Bickel et al. | 385/24 X |
| 4,362,357 | 12/1982 | Stockman et al. | 350/96.16 |
| 4,522,461 | 6/1985 | Mannschke | 350/96.18 |
| 4,707,062 | 11/1987 | Abe et al. | 350/96.16 |
| 4,714,313 | 12/1987 | Kapany et al. | 350/96.16 |
| 4,846,543 | 7/1989 | Kapany et al. | 350/96.16 |
| 4,986,620 | 1/1991 | Severijns et al. | 385/15 |
| 5,058,978 | 10/1991 | Kondoh et al. | 385/43 |
| 5,101,462 | 3/1992 | Sasaki et al. | 385/43 |
| 5,121,452 | 6/1992 | Stowe et al. | 385/46 |
| 5,138,677 | 8/1992 | O'Shaughnessy et al. | 385/43 |
| 5,140,655 | 8/1992 | Bergmann | 385/46 |
| 5,166,994 | 11/1992 | Stowe et al. | 385/48 |
| 5,170,451 | 12/1992 | Ohshima | 385/43 |
| 5,171,345 | 12/1992 | Takemura | 65/4.21 |
| 5,175,779 | 12/1992 | Mortimore | 385/43 |
| 5,175,782 | 12/1992 | Bowen et al. | 385/51 |
| 5,190,364 | 3/1993 | Imoto et al. | 385/24 |
| 5,195,191 | 3/1993 | Stefan et al. | 4/508 |
| 5,216,731 | 6/1993 | Murphy et al. | 385/43 |

OTHER PUBLICATIONS

Himeno et al., "Novel optical–fiber–coupler fabrication technique using multicore fibers", WG1, *OFC/IOOC '93 Technical Digest* pp. 98–99 no month .

Mortimore et al., "Monolithic wavelength–flattened 1 x 7 single–mode fused fiber couplers: theory, fabrication and analysis", *Applied Optics* vol. 30, No. 6, Feb. 20, 1991.

*Primary Examiner*—Rodney B. Bovernick
*Assistant Examiner*—Phan Thi Heartney
*Attorney, Agent, or Firm*—Townsend and Townsend Khourie and Crew; Kenneth R. Allen

[57] ABSTRACT

A 1 X N splitter for single-mode optical fiber includes an individual single-mode optical fiber having its junction end juxtaposed, through a focusing lens/junction element, to the end of a bundle of arbitrarily arranged single-mode fibers which are fused together along a portion of their lengths and which have a total diameter approximately equal to the diameter of the first single-mode fiber. The 1 X N splitter is formed by trimming a limited portion of the cladding from and fusing together in a bundle a plurality of parallel but randomly arranged optical fibers at a fuse region with substantially uniform heat while controllably drawing all the fibers in the bundle at the same time monitoring crosstalk from a single input fiber to all output fibers to draw down the bundle size and to promote uniform crosstalk, then cleaving the fiber bundle at the fused region, abutting and aligning a single-mode optical fiber having cladding of substantially the same diameter as the fused bundle with the cleaved fused bundle and joining the single-mode optical fiber to the cleaved fused bundle with a spot weld which forms a focusing junction. The matched sizing and focusing junction minimizes return losses due to back reflection.

7 Claims, 3 Drawing Sheets

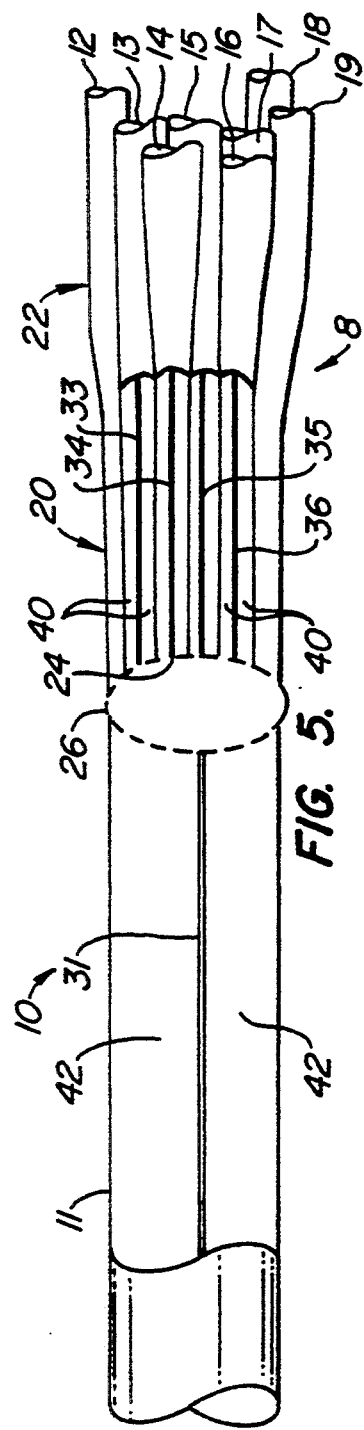
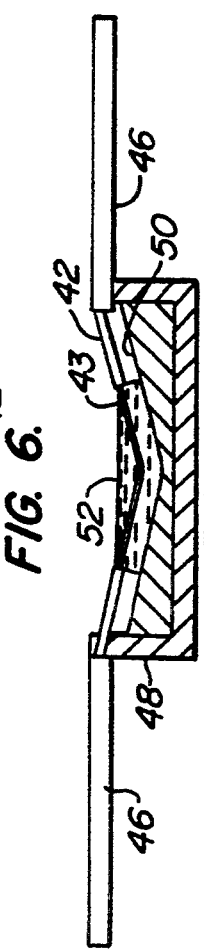
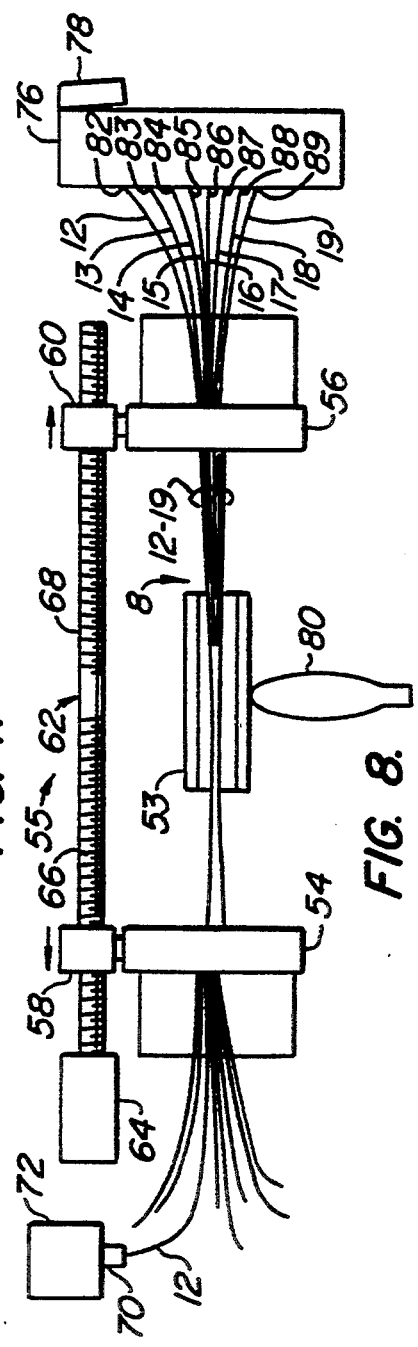

1 X N SPLITTER FOR SINGLE-MODE FIBERS AND METHOD OF CONSTRUCTION

BACKGROUND OF THE INVENTION

This invention relates to couplers for optical fibers used in communication cables. More particularly, this invention relates to fiber optic signal splitters for single-mode-type optical fibers.

Signal splitters are among the most complex and expensive components of a fiber optic system. Both multiple-mode and single-mode fiber systems have a need for efficient splitters. A multiple-mode fiber supports light propagation in its core in a transverse modal pattern consisting of two or more modes as defined by the boundaries of the waveguide formed by the fiber core. Single-mode fibers have a much thinner core and substantially thicker cladding about the core and thereby are constrained to support only the single fundamental propagation mode. Due to the relatively small diameter of the core or waveguide portion of a single mode-optical fiber within a cladding, as compared to the multiple-mode optical fiber, it has heretofore been extremely difficult to construct efficient splitters using single-mode fibers.

A typical prior discrete component splitter for single-mode fiber employed a fused bundle in which all leads except one fiber lead on one side of the fused junction are simply clipped off or ignored. This leaves many unterminated ends. As a consequence, such a splitter is highly susceptible to mechanical failure, spurious input and signal loss.

Other splitters are limited in number of branches due to constraints on cross-sectional configuration, often requiring precise placement and spacing in cross section, or constraints on available space. Integrated optical elements, for example waveguides on a chip, are restricted by available pin-out and fiber-coupling space on the chip. Hence, they are not practical for applications requiring a large number of outputs.

A number of patents were uncovered in a review of the state of the art related to non-integrated optical couplers. Much of the art uncovered dealt with multiple-mode structures and are therefore not directly relevant to single mode structures with the different core geometry. The patents uncovered are discussed briefly hereinbelow.

U.S. Pat. No. 5,138,677 relates to multi-mode fiber, a different technology due to the substantially different ratio of cladding to fiber core. This patent illustrates a multiple fiber bundle in an N to 1 configuration wherein an etching process is employed to remove substantially all of the cladding.

U.S. Pat. No. 5,101,462 discloses a two-fiber coupler. The structure and purpose would not lend itself to a 1 by N splitter. In the construction, a preheat step is required.

U.S. Pat. No. 4,362,357 discloses a specific multimode fiber structure.

U.S. Pat. No. 5,175,782 discloses a structure with a controlled geometry which requires the use of an outside layer. The structure is limited to no more than an 8 to 1 split.

U.S. Pat. No. 5,216,731 discloses a machine for building optical fiber couplers which might be adapted for use in construction of a splitter according to the invention.

U.S. Pat. No. 5,140,655 discloses a bidirectional optical star, which is one potential application of the present invention.

U.S. Pat. No. 5,170,451 discloses another potential application of the present invention.

U.S. Pat. No. 5,171,345 discloses a mechanism wherein two fibers are fused. The invention therein would exhibit uneven fiber heating and uneven drawing of fiber.

U.S. Pat. No. 5,175,779 discloses a mechanism whereby a fiber bundle can be fused and drawn using a collar structure.

U.S. Pat. No. 5,190,364 discloses the heating of a fiber in a large chamber, and the covering of an entire bundle with a dielectric layer.

U.S. Pat. No. 4,522,461 discloses an optical multiplexer with a graded index rod lens.

U.S. Pat. No. 5,121,452 discloses a fiber optic power splitter comprising a geometry-specific twisted bundle of fibers having a required center fiber.

In a poster preview session of the OFC/IOOC conference on Oct. 13, 1993, Himeno et al presented a description of an optical-fiber-couple fabrication technique using multicore fibers. A description was contained in the accompanying technical digest (Himeno et al., "Novel optical-fiber-couple fabrication technique using multicore fibers," WG1, OFC/IOOC '93 Technical Digest). Therein a technique was described wherein a bundled fiber set was arc-fusion-spliced to a tapered elongated multicore fiber of the same number of fibers and same diameter but with evidently no attempted alignment between multiple bundled fibers and a single elongated multicore fiber. The technique does not disclose how to fabricate an individual mode star coupler for a single single-mode fiber to a bundle of single-mode fibers, and it teaches that alignment of fibers is not needed.

In the preparation of an optical fiber to construct a coupler, particularly a multiple mode coupler, it is known to strip off the outside plastic covering, called a buffer, and to etch off substantially all of the quartz fiber cladding to yield a thinned fiber consisting of a high refractive index quartz core. Multiple-mode fibers may then be fused in parallel to one another.

What is needed is an efficient, low-loss and low-cost splitter for single-mode fiber which is relatively easy to construct and which can serve to multiplex a single output signal of a single fiber into an arbitrarily large number of output fibers.

SUMMARY OF THE INVENTION

According to the invention, a 1 X N splitter for single-mode optical fiber comprises a an individual single-mode optical fiber having its junction end juxtaposed, through a focusing lens/junction element formed for example by an arc weld, to the end of a bundle of arbitrarily arranged single-mode fibers which are fused together along a portion of their lengths and which have a total diameter approximately equal to the diameter of the first single-mode fiber. The 1 X N splitter is formed by trimming a limited portion of the cladding from and fusing together in a bundle a plurality of parallel but randomly arranged optical fibers at a fuse region with substantially uniform heat below the melting point of the fibers, while controllably drawing all the fibers in the bundle and at the same time monitoring crosstalk from a single input fiber to all output fibers to shrink the bundle size and to promote uniform crosstalk, then cleaving the fiber bundle at the fused region, abutting and aligning an undrawn single-mode optical fiber, having cladding of substantially the same diameter as the total diameter of the fused bundle, with the cleaved fused bundle and joining the single-mode optical fiber to the cleaved fused bundle with a spot weld which forms a focusing Junction light-collimating lens. The matched sizing and lens junction minimizes return losses by avoiding back reflection.

The invention will be better understood from the following detailed description and accompanying drawings.

BRIEF DESCRIPTION OF THE DRAWINGS

FIG. 5 is a detailed side view in partial cutaway of a detail of an optical fiber splitter according to the invention.

FIG. 6 is illustrative of a first step in construction of a splitter according to the invention.

FIG. 7 is illustrative of a second step in construction of a splitter according to the invention.

FIG. 8 is illustrative of a third step in construction of a splitter according to the invention.

DETAILED DESCRIPTION OF SPECIFIC EMBODIMENTS

Figure 1:
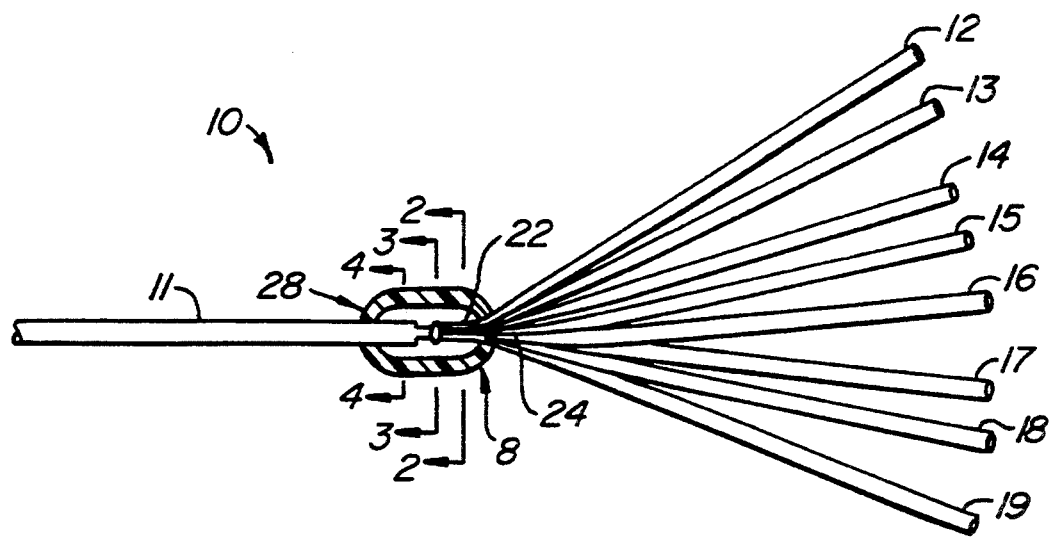
FIG. 1 is a side view in partial cutaway of an optical fiber splitter according to the invention.
Figure 2:
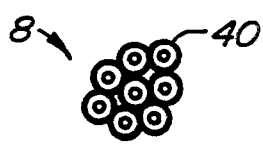
FIG. 2 is a cross-sectional view of a fiber along section line 2—2 of FIG. 1.
Figure 3:
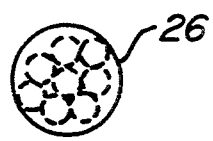
FIG. 3 is a cross-sectional view of a fiber along section line 3—3 of FIG. 1.
Figure 4:
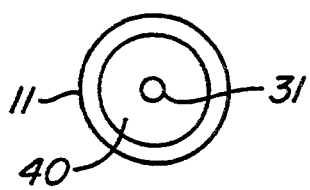
FIG. 4 is a cross-sectional view of a fiber along section line 4—4 of FIG. 1.

Referring to FIG. 1 and FIG. 5 there is shown a single-mode fiber optic 1XN splitter 10 in accordance with the invention. The splitter is formed of a plurality of stock quartz optical single-mode cylindrical fibers (e.g., 11-19) typically doped with germanium and processed and packaged according to the invention. (Stock fiber material is manufactured by Corning Glass Works.)

A plurality of arbitrarily-grouped and arbitrarily large number of fibers (e.g., 12-19) of reduced diameter are prepared by fusing together in a twisted parallel bundle 8 along a short length, herein a fused region 20, as hereinafter explained in connection with the method of construction. Each of the prepared fibers 12-19 has a very small diameter core 32-19 (FIG. 5, not all shown) of a few microns (3-5 $\mu$m) diameter to sustain only a single optical mode at the design wavelength for optical energy in the fiber. Extending from the fused region 20 of bundle 8 is a tapered region 22 wherein the individual fibers 12-19 have an increasingly expanded diameter to the size of stock single mode fiber. At or beyond the tapered region 22 the fused bundle separates into individual fibers 12-19.

According to the invention, end portion 24 of the fused region 20 is cleaved to form a termination and is fused via an optically-transparent junction element 26 to one stock-type quartz optical single-mode fiber 11 so its core 31 is fused to the optically transparent junction element 26. The amalgamated bundle 8 is of very closely the same diameter as the single fiber 11 and the junction element 26 (FIGS. 2-5), and the respective cores 32-39 of the bundle 8 are all fused to the junction element 26, each surrounded with at least a small amount of cladding material 40. Cladding material 42 of the single fiber 11 is of a diameter substantially equal to the diameter of the junction element 26, typically about 125 $\mu$m, which is also roughly the total diameter of the bundle 8. The core 31 of single fiber 11 has a diameter of about 10 $\mu$m. (Not shown is the protective covering or buffer around the cladding, typically a of a plastic material.)

According to the invention, the junction element 26 forms a focusing lens and more specifically a matching element which minimizes losses due to back reflection. The junction element 26 is formed of the same material as the fibers 11-19 and is in fact the result of fusing the bundle 8 of fibers 12-19 directly to fiber 11 in an abutting and optically-coupled mating position. The fused linking is typically formed merely by aligning and abutting the fiber 11 to the prepared bundle 8 and arc welding the fiber 11 to the bundle 8, thus forming as the junction element a bead from melted common material. The splitter is enclosed in a protective housing 28 (FIG. 1).

Referring to FIGS. 6-10, there is illustrated a process for manufacturing according to the invention.

A plurality of stock fibers, for example a fiber 44, is stripped of its plastic buffer 46 down to the fiber cladding 42 (Step A, FIG. 6). This can be done with any common mechanical stripping device. The result is exposure of cladding of about 125 $\mu$m diameter over a length of up to about 50 mm between plastic buffered segments of about 250 $\mu$m in diameter.

The cladding 42 between the buffer 46 is then etched away along a segment 43 in for example a vat 48 with an etch resistant liner 50 containing a concentration of an acid known to etch glass, such as hydrofluoric acid (HF) 52 (Step B, FIG. 7). The fiber cladding is etched to a diameter so that if selected ones of the fibers 12-19 (FIG. 2) were laid side by side to define a bundle diameter, the sum of the diameters across would be less than about 100 $\mu$m, or slightly less than the cladding diameter of a stock fiber 11. Preferably, however, the cladding diameter of the etched fibers is not reduced by much more than 50% by the etching process. (Subsequent processses may reduce it to, for example, about one-sixth the original cladding diameter.)

Referring to FIG. 8, there is illustrated the step of fusing a plurality of etched fibers 12-19 into a bundle 8 using a fabrication station 55 (Step C). The etched fibers 12-19 are threaded through a quartz tube and first and second perforated jigs 54, 56, then they are twisted relative to one another under slight tension and clamped in the jigs 54, 56. The jigs 54, 56 are mounted on trucks 58, 60 which ride on a threaded shaft 62 driven by a motor 64. The threaded shaft 62 has two sets of threads 66, 68, one counter-clockwise and the other clockwise, so that rotation of the shaft causes the trucks 50, 60 to travel in opposing directions, for the purpose of pulling upon the fibers 12-19. A single fiber, for example fiber 12, is selected and connected at one end to the optical output 70 of a drive laser 72. (The drive laser may be a laser switchable between two wavelengths, for example). All of the fibers 12-19 are connected at the other end to a bank of individual signal detectors 82-29, which in turn are connected to an analyzer 76. The analyzer 76 has an output 78 which shows the light level transmitted through each fiber 12–19.

In operation, the fabrication station 55 is used to fuse, draw and shrink the fibers 12–19 into a bundle 8 of approximately the same diameter as a stock fiber. To this end, heat from for example a flame 80 is applied to the quartz tube 53 enclosing the fibers 12–19 to heat a length of the fibers relatively uniformly to soften the fibers 12–19 without actually melting the fibers. This temperature is between about 700° C. and 1470° C. for quartz. While heating, drive laser light is applied through fiber 12 with the light outputs of each of the fibers 12–19 are monitored at the analyzer 76. At the same time, drive moter 64 is pulling on the twisted fiber bundle 8 to create a relatively uniform tension and to press the bundle 8 together to a point of fusion such that optical energy is distributed substantially evenly across the fibers 12–19. When output through all of the fibers is noted to be within a desired tolerance for substantial uniformity, and the diameter of the bundle is within the desired target diameter, the drawing and heating of the bundle 8 are terminated, and the bundle 8 is allowed to cool.

Figure 9:
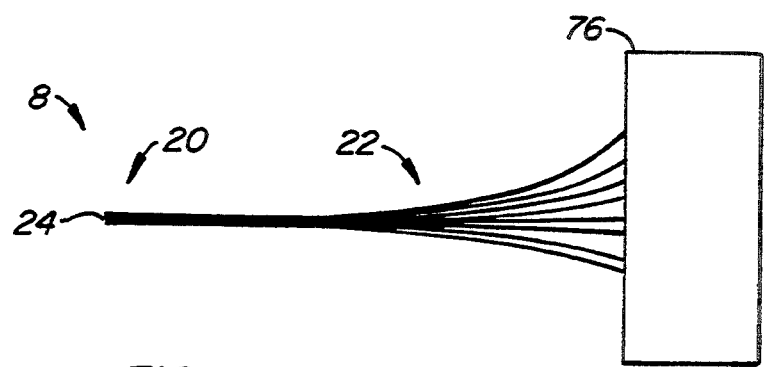
FIG. 9 is illustrative of a fourth step in construction of a splitter according to the invention.

Referring to FIG. 9, after the bundle 8 has cooled sufficiently, the bundle 8 is cleaved in the center of the fused region 20 to yield two substantially identical bundles 8 (one shown) with an exposed end portion 24 (Step D). (The bundle 8 may remain connected to the analyzer 76 for the subsequent steps.)

Figure 10:
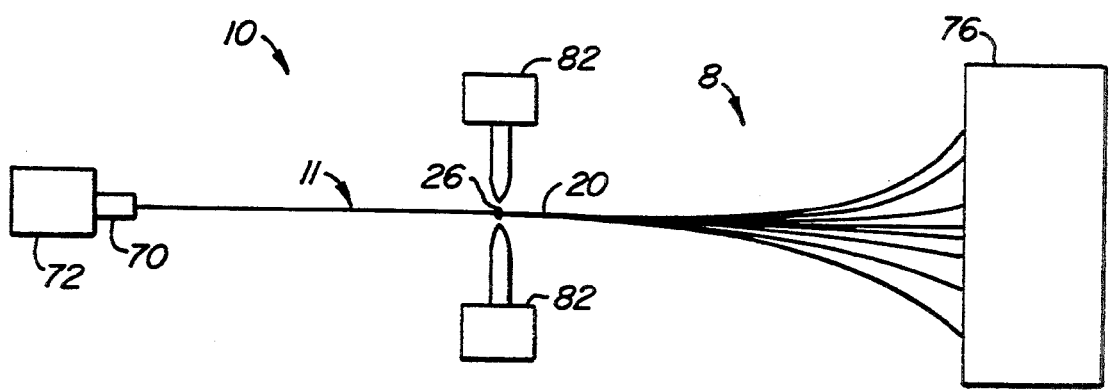
FIG. 10 is illustrative of a fifth step in construction of a splitter according to the invention.

Referring to FIG. 10, the exposed end portion 24 of the fused region 20 is then aligned with and abutted to a single stock fiber 11, as indicated by signals detected by the analyzer 76, and then fused via an optically-transparent junction element 26 to one stock-type quartz optical single-mode fiber 11 by means of an electric arc welder 82 so its core 31 is fused to the optically transparent junction element 26 (Step E). The result is in its detail illustrated in FIG. 2.

The splitter 10 is functionally finished. However, for protection against the environment, the junction region is typically encased in packaging 28 (FIG. 1).

Figure 11:
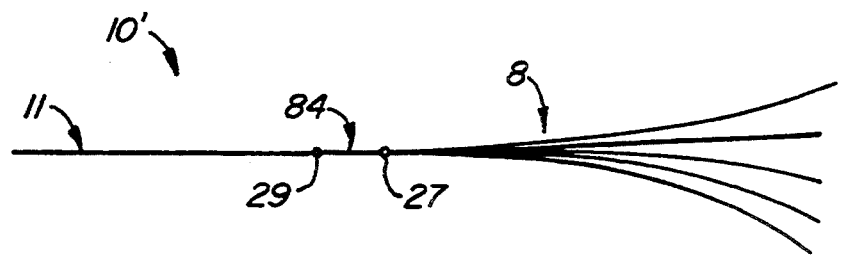
FIG. 11 is a representation of an alternative embodiment of the invention.

A possible alternative splitter 10' involves the insertion of a short length of multimode fiber 84 (FIG. 11) in alignment with and between the bundle 8 and the stock fiber 11. Each side of the multimode fiber is fused at respective junction elements 27 and 29. The multimode fiber, with its inherently larger core, serves as an effective transition element between single mode fiber and the fused portion 20 of a bundle 8, particularly where the bundle 8 contains a large number of fibers, and that it may do so without jeopardizing single mode coupling.

The invention has been explained in reference to specific embodiments. Other embodiments will be apparent to those of ordinary skill in the art in light of this description. It is therefore not intended that this invention be limited, except as indicated by the appended claims.

What is claimed is:

1. A single-mode optical fiber splitter comprising:
   an individual single-mode optical fiber;
   a bundle of non-symmetrical arranged single-mode fibers which are fused together along a portion of their lengths and having an bundle end; and
   a focusing lens/junction element;
   said individual single-mode optical fiber having a junction end, said junction end being juxtaposed, through said focusing lens/junction element, to the bundle end of said bundle;
   and wherein the bundle has a total diameter approximately equal to the diameter of said individual single-mode fiber.

2. The splitter according to claim 1 wherein said focusing lens/junction element is formed by fusing said junction end to said bundle end.

3. The splitter according to claim 1 wherein said focusing lens/junction element is formed by welding said junction end to said bundle end.

4. A method for making a single-mode optical fiber splitter from single-mode optical fibers having a cladding, comprising the steps of:
   trimming a limited portion of the cladding from said optical fibers;
   fusing together in a fiber bundle a plurality of parallel but randomly-arranged optical fibers at a fuse region with substantially uniform heat while controllably drawing all the fibers in the bundle at the same time monitoring crosstalk from a single input fiber to all output fibers to draw down the bundle size and to promote uniform crosstalk;
   thereafter cleaving the fiber bundle at the fused region to form a bundle end of a diameter substantially equal to the diameter of a single undrawn single-mode optical fiber;
   abutting and aligning a single-mode optical fiber with the fiber bundle so fused and cleaved, the single-mode optical fiber being of substantially the same diameter as the fiber bundle so fused; and
   joining an end of the single-mode optical fiber to an end of the cleaved fused bundle using an optically-transmissive focusing junction.

5. The method according to claim 4 wherein said joining step comprises spot welding said single-mode optical fiber end to said cleaved fused bundle end.

6. An optical fiber splitter for single mode optical signals comprising:
   an individual single-mode optical fiber;
   a multiple-mode optical fiber segment having a first end and a second end;
   a bundle of non-symmetrical arranged single-mode fibers which are fused together along a portion of their lengths and having an bundle end; and
   a first focusing lens/junction element;
   a second focusing lens/junction element;
   said individual single-mode optical fiber having a junction end, said junction end being juxtaposed, through said first focusing lens/junction element, the first end of said multiple mode optical fiber element;
   said bundle end of said bundle being juxtaposed to said second end;
   and wherein the bundle has a total diameter approximately equal to the diameter of said individual single-mode fiber.

7. The splitter according to claim 6 wherein said first focusing lens/junction element and said second focusing lens/junction element are formed by fusing.

* * * * *